(12) United States Patent
Schmidt (10) Patent No.: US 10,304,116 B2
(45) Date of Patent: May 28, 2019

(54) SYSTEM AND METHOD FOR TARGETING CONTENT BASED ON FILTER ACTIVITY

(71) Applicant: CBS Interactive Inc., San Francisco, CA (US)

(72) Inventor: Daniel F. Schmidt, San Francisco, CA (US)

(73) Assignee: CBS INTERACTIVE, INC., County of New Castle, DE (US)

( * ) Notice: Subject to any disclaimer, the term of this patent is extended or adjusted under 35 U.S.C. 154(b) by 301 days.

(21) Appl. No.: 15/189,331

(22) Filed: Jun. 22, 2016

(65) Prior Publication Data

US 2016/0358243 A1    Dec. 8, 2016

Related U.S. Application Data

(63) Continuation of application No. 12/467,368, filed on May 18, 2009, now abandoned.

(51) Int. Cl.
*G06F 17/30* (2006.01)
*G06Q 30/06* (2012.01)
*G06Q 30/02* (2012.01)

(52) U.S. Cl.
CPC ......... *G06Q 30/0631* (2013.01); *G06Q 30/02* (2013.01); *G06Q 30/0603* (2013.01); *G06Q 30/0641* (2013.01)

(58) Field of Classification Search
CPC .......... G06Q 30/0631; G06Q 30/0603; G06Q 30/0641
USPC ........................................ 707/740
See application file for complete search history.

(56) References Cited

U.S. PATENT DOCUMENTS

| | | | | |
|---|---|---|---|---|
| 7,836,051 B1* | 11/2010 | Mason | ............ | G06F 17/30867 707/734 |
| 2009/0150535 A1* | 6/2009 | Abbott | ............ | G06F 17/30017 709/223 |
| 2009/0222720 A1* | 9/2009 | Drieschner | ....... | G06F 17/30887 715/234 |

* cited by examiner

*Primary Examiner* — Vincent F Boccio
(74) *Attorney, Agent, or Firm* — Rimon PC; Marc S. Kaufman (57) ABSTRACT

Various embodiments are presented which comprise an electronic catalog of products, wherein the catalog comprises a taxonomy of product categories and products within the categories, wherein various users input filter parameters and these are monitored, whereupon a new set of filter parameters are accepted and compared to the past set of filter parameters to generate content recommendations.

27 Claims, 9 Drawing Sheets

Analysis Module(106)

Monitoring Log (901A):
Laptops:Sony™:>$2500 (904)
Laptops:Apple™:>$2500 (904)
Laptops:Sony™:>$2500:Blu-Ray™ Drive Included: 3 GB or Greater RAM (904)
Laptops:Acer™:<$300 (904)
Laptops: $1500-$2000:Blu-Ray™ Drive Included:2 GB or Greater RAM (904)
Laptops: Asus™:$400-$500 (904)
Laptops: Dell™: $900-$1000 (904)
Laptops: HP™: 1 GB RAM (904)

New Input (902A):
Laptops:Sony™ (904)

Conclusion(903A): Sony should target its ads towards the upper price range, its primary competitor is Apple, and it needs to emphasize its laptops in that price range that have Blu-Ray drives and 2GB or more RAM.

Monitoring Log (901B):
MP3 Players:Flash-based:Apple™ (904)
MP3 Players:Flash-based:Apple™:Touch-Screen (904)
MP3 Players:Flash-based:$60 or less:16 GB or less (904)
MP3 Players:Flash-based: Apple™: 32 GB (904)
MP3 Players: Hard drive: 30-60 GB (904)
MP3 Players: Hard drive: 120 GB or more:Archos™ (904)
MP3 Players: Flash-based: FM Radio (904)

New Input (902B): MP3 Players:Creative
Conclusion(903B): Creative may want to market its inexpensive flash drive MP3 Players, or market hard-drive MP3 players with smaller sized hard drives than those of Archos at a better price point. Also, flash-based MP3 players with FM Radio capabilities fulfill an unmet need, so Creative could target players of this type. Finally, to compete against Apple's players, Creative's players may need to be touch-screen.

SYSTEM AND METHOD FOR TARGETING CONTENT BASED ON FILTER ACTIVITY

CROSS-REFERENCE TO RELATED APPLICATIONS

This application is a continuation of U.S. application Ser. No. 12/467,368 filed May 18, 2009 (currently pending), the disclosure of which is hereby incorporated by reference in its entirety.

The present invention shares common subject matter with the following applications, which also share common inventor and assignee: application Ser. No. 12/467,384, titled "SYSTEM AND METHOD FOR PRESENTING FILTER OPTIONS TO A USER BASED ON ONGOING MONITORING OF FILTER SELECTIONS", application Ser. No. 12/467,394, titled "SYSTEM AND METHOD FOR TRACKING FILTER ACTIVITY AND MONITORING TRENDS ASSOCIATED WITH SAID ACTIVITY", and application Ser. No. 12/467,414, titled "SYSTEM AND METHOD FOR INCORPORATING USER INPUT INTO FILTER-BASED NAVIGATION OF AN ELECTRONIC CATALOG", all also submitted on this date. These co-pending applications were not previously published in any form.

FIELD OF THE INVENTION

The present invention relates to a system and method for recommending content based on filter parameters that user specifies while navigating an online catalog of products.

DESCRIPTION OF THE RELATED ART

Many websites are configured as online catalogs. These catalogs act as alternatives to traditional paper catalogs and offer enhanced navigational features when compared to their paper counterparts, as well as the advantages of broad, easy distribution. With the advent and increasing popularity of the Internet, suppliers have access to a much larger customer base. Through the Internet, the market base of manufacturers and resellers may be maximized while the associated overhead may potentially be drastically reduced. If an electronic catalog is well-organized and presented, it can help consumers to make good purchasing decisions by providing extensive information about the products they contain in an easy-to-navigate manner. Such a catalog either allows the consumers to gain information about products they will purchase elsewhere or to make purchases within the site itself. Additionally, such a catalog serves as a site where companies may purchase advertising to market their products.

Such electronic catalogs generally store, in a database, information about a number of products which may be anything from electronics to housewares to apparel, or any other type of item which may be depicted and/or described electronically. Such items may be described by a taxonomy, which describes the set of products with a set of information that consists of a set of attributes that assume values. That is, each product might be associated with a price, brand, or other attribute. Some attributes would only be stored for some classes of product. For example, weight might be a attribute with respect to laptops, but not desktop computers, while both might have a processor speed attribute.

Once a retailer or other content provider has provided a taxonomy for its products, it remains for the users of the catalog system to retrieve the products using the taxonomy system. One way to do this is by performing searches using filters. These filters are composed of individual filter parameters, which are rules which narrow the selection of products in a taxonomy according to some criterion. Such filters constrain the allowable values of the attributes, and thereby generate a more manageable subset of the products that the user may use, manipulate, and digest. Together, a set of filter parameters forms a filter parameter set, which represents a progressively narrowed selection of filter parameters. An example filter parameter set would be that if a user were searching for digital cameras, the user might want cameras from Canon™, which are 6 megapixels or greater, and which are under $300 in price. A filter parameter set further consists of the individual, discrete filter parameters, which limit the user's search in a progressive manner. Each filter parameter imposes a constraint on one or more product attributes at a time.

Filters allow the users to reduce the potentially huge numbers of products which otherwise occupy catalogs and reduce them to a manageable numbers. They also allow users to focus their searches to meet their individualized needs, as well as incorporating factors such as ability to pay or brand requirements due to purchasing contracts.

It is known in the art to use user actions to recommend, or target, content. For example, users of a search engine can be presented with advertisements based on search actions.

SUMMARY OF THE INVENTION

Applicant has discovered that one can identify favorable marketing opportunities through analysis of filter parameter selection. By using information which is incidental to the browsing operation of the catalog, valuable conclusions about how advertisers associated with the catalog may market their products can be ascertained in conjunction with the normal operation of the catalog. Alternatively, recommendations about how to market products can be used in external settings.

The present invention enables data about past filter parameter selection to be collected and used to draw inferences about approaches to marketing with respect to present filter data. This is accomplished with respect to the products in a catalog that are organized in a taxonomy. By monitoring filter parameter selections, patterns emerge in the distribution of filter parameter selections which when compared to the present filter data, allow embodiments to provide information about how information about a present user, as reflected in their filter parameter selections, should be the target of marketing efforts.

According to one embodiment of the invention, there is provided: A computer system, comprising: a database module that stores an electronic catalog of products, wherein the catalog comprises a taxonomy of product categories and products within the categories, the catalog further comprising attributes which describe products in a category and at least one value for said attributes, a user interface module configured to accept current filter parameters relating to at least one of the categories and values of the attributes in response to a selection by the user, a query module configured to receive the current filter parameters, query the catalog, and present information in the catalog corresponding to the filter parameters to said user interface module for display to users, a monitoring module that monitors the current filter parameters to generate a set of user activity data comprising plural previous filter parameters, and a user activity data analysis module, configured to compare said user activity data with the current filter parameters to generate one or more content recommendations.

According to one embodiment of the invention, there is provided: A method involving steps to be performing on a computing system consisting of multiple modules designed to perform computing functions which transform data monitoring results, wherein at least part of the computing system's functionality is performed by hardware, comprising: storing an electronic catalog of products with a database module, wherein the catalog comprises a taxonomy of product categories and products within the categories, the catalog further comprising attributes which describe products in a category and at least one value for said attributes, accepting with a user interface module configured to accept current filter parameters relating to at least one of the categories and values of the attributes in response to a selection by the user, receiving with a query module configured to receive the current filter parameters, querying with said query module the catalog, and presenting with said query module information in the catalog corresponding to the filter parameters to said user interface module for display to users, monitoring with a monitoring module that monitors the current filter parameters to generate a set of user activity data comprising plural previous filter parameters, and comparing with user activity data analysis module, that is configured to compare said user activity data with the current filter parameters to generate one or more content recommendations.

According to one embodiment of the invention, there is provided: An apparatus designed to perform computing functions which transform data monitoring results, wherein at least part of the apparatus's functionality is performed by hardware, comprising: means for storing an electronic catalog of products with a database module, wherein the catalog comprises a taxonomy of product categories and products within the categories, the catalog further comprising attributes which describe products in a category and at least one value for said attributes, means for accepting with a user interface module configured to accept current filter parameters relating to at least one of the categories and values of the attributes in response to a selection by the user, means for receiving with a query module configured to receive the current filter parameters, means for querying with said query module the catalog, and means for presenting with said query module information in the catalog corresponding to the filter parameters to said user interface module for display to users, means for monitoring with a monitoring module that monitors the current filter parameters to generate a set of user activity data comprising plural previous filter parameters, and means for comparing with user activity data analysis module, that is configured to compare said user activity data with the current filter parameters to generate one or more content recommendations.

According to one embodiment of the invention, there is provided: Computer readable media, having instructions stored thereon, wherein the instructions, when executed by a processor, perform computing functions which transform data monitoring results, comprising: instructions for storing an electronic catalog of products with a database module, wherein the catalog comprises a taxonomy of product categories and products within the categories, the catalog further comprising attributes which describe products in a category and at least one value for said attributes, instructions for accepting with a user interface module configured to accept current filter parameters relating to at least one of the categories and values of the attributes in response to a selection by the user, instructions for receiving with a query module configured to receive the current filter parameters, instructions for querying with said query module the catalog, and means for presenting with said query module information in the catalog corresponding to the filter parameters to said user interface module for display to users, instructions for monitoring with a monitoring module that monitors the current filter parameters to generate a set of user activity data comprising plural previous filter parameters, and instructions for comparing with user activity data analysis module, that is configured to compare said user activity data with the current filter parameters to generate one or more content recommendations.

DETAILED DESCRIPTION OF THE INVENTION

In the following description, numerous specific details are set forth in order to provide a thorough understanding of the present invention, it will be apparent, however, to one skilled in the art, that the present invention may be practiced without some or all of these specific details. In other instances, well known process steps have not been described in detail in order not to unnecessarily obscure the present invention.

Embodiments are described herein that involve catalog data to which is stored and organized in an efficient manner through the use of a taxonomy. The taxonomy categorizes the products by using attributes, where products are associated with one or more values of the attributes. Such attributes describe and organize the products in the catalog for retrieval.

Figure 1:
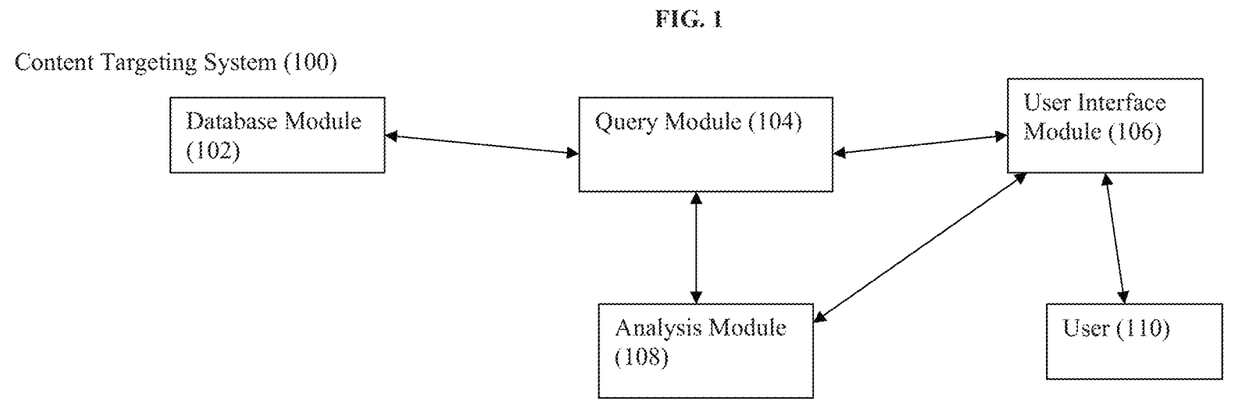
FIG. 1 is a diagram illustrating the interactions between the components of a system embodiment of the present invention.

The configuration of the content targeting system 100 is characterized in FIG. 1. The catalog is ideally stored in a database module 102. The database may preferably employ a relational model, though it may alternatively employ a flat model, hierarchical model, network model, dimensional model, object model, object-relational model or any combination of the above or other database formats. The database may use a querying language such as SQL to retrieve data internally. Alternatively, the catalog may be stored in another file or collection of files such as a word processing document, or spreadsheet. The catalog information may be stored on a single machine or on multiple machines over a network. Ideally the catalog is accessible over the Web though a web browser or over another network, but embodiments exist where the catalog is accessible directly from a dedicated program where the catalog is stored locally. The contents of the catalog may be stored upon any tangible medium, such as, but not limited to: magnetic media, optical media, magneto-optical media, solid-state memory, and/or flash memory. The catalog may be stored locally or distributed over a network.

The database receives requests to access the contents of the catalog from query module 104, which mediates requests which are required by the user interface module 106, which may preferably be a monitor with input devices such as a keyboard and mouse providing a Web page, or other GUI interface, but may also involve alterative forms of interaction such as a command line, audio input/output or printed output, or assorted I/O peripherals such as a joystick, gamepad, trackpad, trackball, or other forms of I/O such as those used by the disabled, in order to interact with the users 110 and inform them about the operation of the system and obtain their desired filter parameters. This information flows to and from the user interface module 106 to the analysis module 108, where the computation performed by the device with respect to the information in the catalog. The analysis module 108 then presents the results of its computation to the users 110 via the user interface module 106.

Within the catalog, the taxonomy allows the products to be divided into categories, each of which has subcategories with their own particular set of subcategories. This categorization exists based on the structure of the attributes that are each associated with a given category of product. As an example, in one embodiment, the products could be computers, which are divided into subcategories of laptops and desktops. The laptops can be further subdivided into subcategories, which might include "netbook", "thin-and-light", "mainstream", and "desktop replacement". Attributes in these subcategories can be weight, price (which might be divided by ranges), and type of processor. On the other hand the desktops might also be have the attributes of price and type of processor, but might have other attributes associated with them, like "form factor" and "number of drive bays". Moreover, certain attributes might have multi-leveled answers. For example, a processor might be have a processor brand of Intel™, which would then lead to an attribute to differentiate that it was a "Core 2™", then "Core 2 Duo™" as opposed to "Core 2 Quad™".

Figure 2:
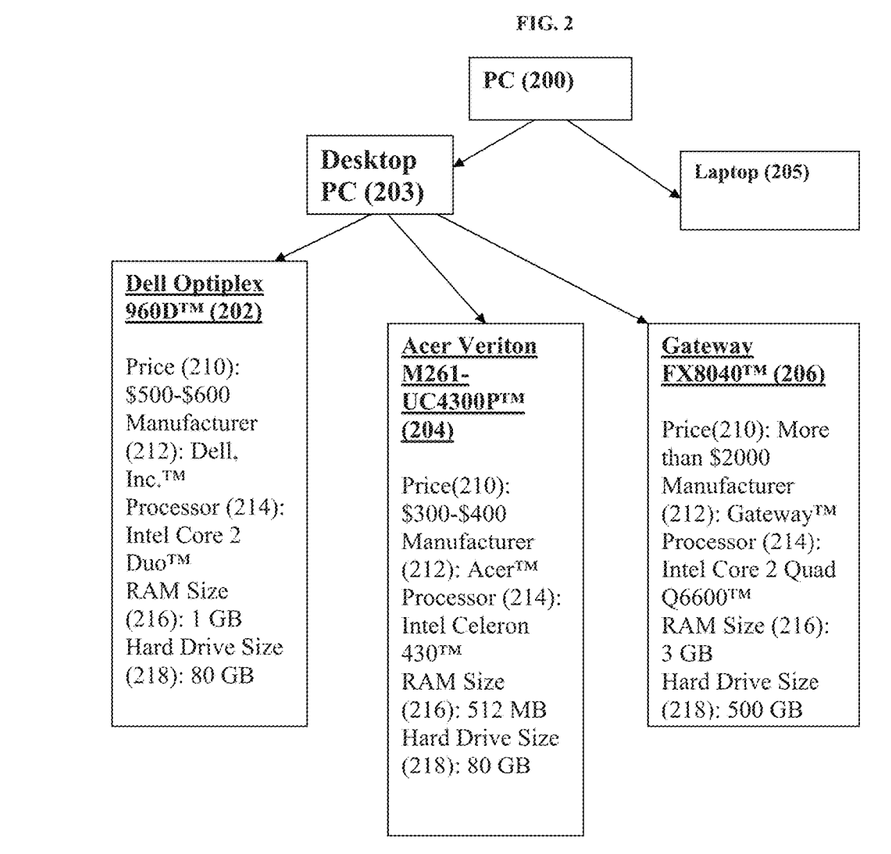
FIG. 2 is a diagram illustrating a taxonomy in accordance with system in which the present invention may be implemented.

An example taxonomy is presented in FIG. 2, for Desktop PCs. The category of PCs 200 branches into the subcategories of Desktop PCs 203 and Laptop PCs 205. Desktop PCs 203 contain 3 examples of Desktop PCs, Optiplex 960D™ (202) Acer Veriton M261-UC4300P™ (204), and the Gateway FX8040™ (206). Each of these has a value for attributes such as price 210, manufacturer 212, processor 214, RAM size 216, and hard drive size 218. Clearly, the implementation of such a taxonomy will differ by the database model or alternative schema used to store the database in the database module 102. However, given a relational model, such a taxonomy can be stored in one embodiment by associating the products with unique product IDs, then creating tables that associate the IDs with attributes, then creating tables that associate the IDs within the attributes with various values within the taxonomy, in a manner well known in the art to associate pieces of data with information that describes them through relational tables. However, many alternative embodiments are possible and this merely represents a preferred method of storing the catalog if the RDBMS approach is chosen.

It is to be noted that the catalog need not represent a set of tangible products represented by nodes within the taxonomy. The catalog may also operate on a digital level, and contain items of digital content. These items may contain digital text, audio, MIDI data, recorded audiobooks, digital music, bitmapped and/or vector graphics, digital photographs, video, movies, TV episodes, digital documents, animations, software, web content, multimedia, any form of encoded or archived data, and/or any other type of file or group of files which may be use to store useful computer data. These files may be stored locally or remotely from the web site or other interface shell which is used to allow the user to access the catalog.

Ideally, a catalog which is an embodiment of the invention which incorporates one or more of these data types will operate as described below, except that attributes of the one or more data types will reflect characteristics of the type of data involved when using filters instead of characteristics of merchandise. For example, a catalog which contains video might have attributes such as "length" (which might be various ranges of minutes), "type" (which might be "black-and-white" or "color", or alternatively might include different levels of color quality), or might involve more qualitative attributes such as "genre" (i.e. action, comedy, drama, science-fiction, western) or "rating" (i.e., some sort of scale such as a star system or a points system). Note that some catalogs will have items in the taxonomy which may reflect pieces of merchandise which are linked to "virtual merchandise", that is pieces of digital media . . . for example, pieces of digital music might be linked to real-world CD albums on which the songs are located. This may allow the embodiments to make intelligent ad recommendations . . . for example, if the filter selections (as described below) frequently involve songs from a specific artist, as well as albums that are inexpensive, if the user selects an album or a song from that artist, the embodiment may suggest advertising to the user find inexpensive digital media from that artist that the user would be likely to purchase.

Building upon the catalog, the embodiments allow the products to be accessed through the use of filters. These filters consist of combinations of filter parameters which limit the values. These filter parameters include a set of parameters requiring one or more of: a given attribute equals a specific value; a given attribute is not equal to a specific value; a given attribute is greater than a specific value; a given attribute is greater than or equal to a specific value; a given attribute is less than a specific value; a given category value is less than or equal to a specific value; a given attribute falls within a specific interval; a given category value falls outside of a specific interval, or other variables.

The order in which filter parameters are selected may be significant, because, for example, if the user selects cameras such that they are 10 MP or greater as his or her first constraint, this may lead to available lens types that would not have been available had, for example, the user selected a camera that is $50 or less. Also, some heuristics used by certain embodiments may give weight to the first filters and assume that they are more important to the user.

Screenshots illustrating an example of a catalog interface which would contain an assortment of technology products and then progressively use filter parameters to narrow the selection of products which are under consideration and which are displayed in FIG. 3-7. Furthermore, the embodiments record and monitor one or more users' choice of filters over time, providing a pool of data which can then been used as a basis, in combination with a new filter selection, for recommendations of content.

Figure 3:
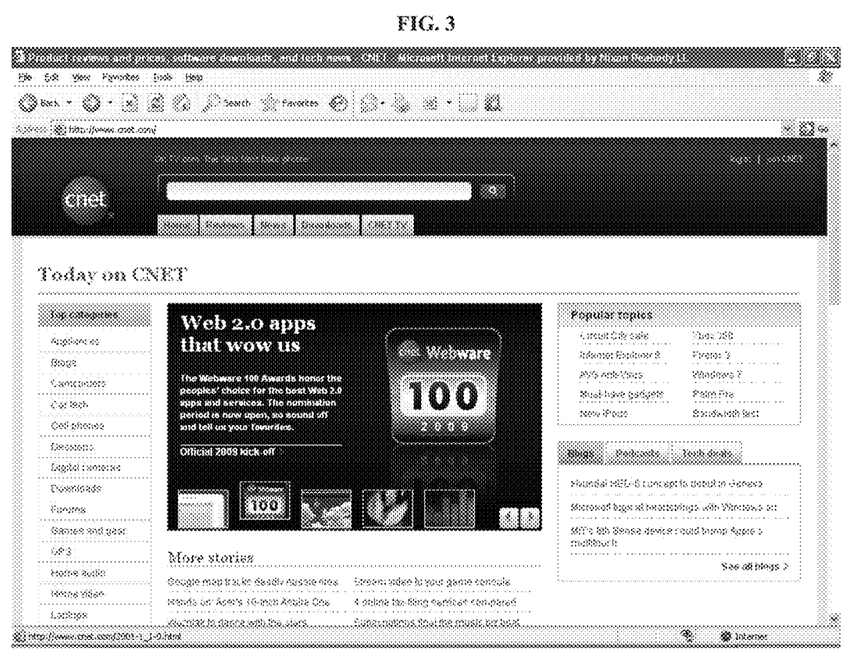
FIG. 3 is a screenshot of an catalog in accordance with the invention depicting a front-page for category selection.
Figure 4:
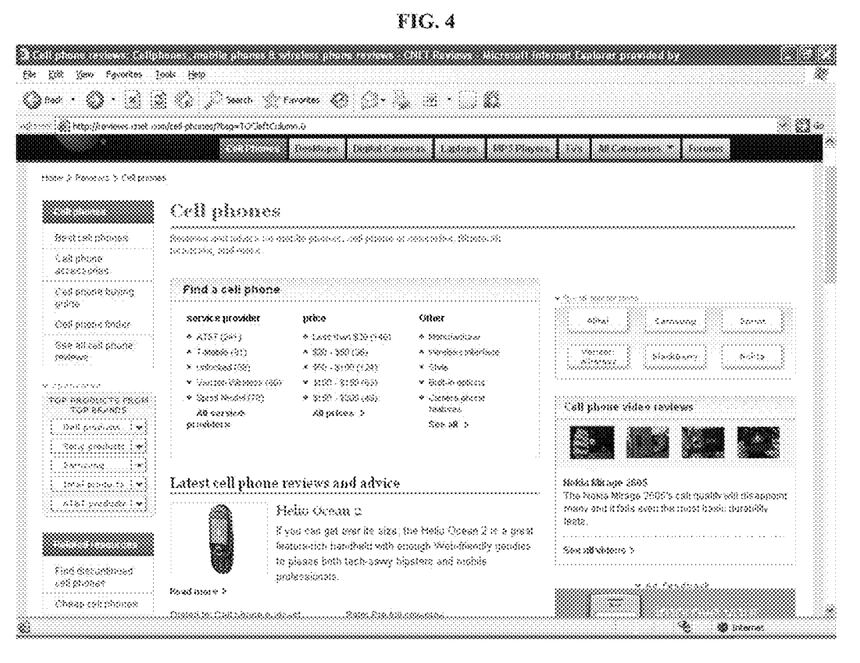
FIG. 4 is a screenshot of an catalog in accordance with the invention depicting a page where the cell phone category has been selected.
Figure 5:
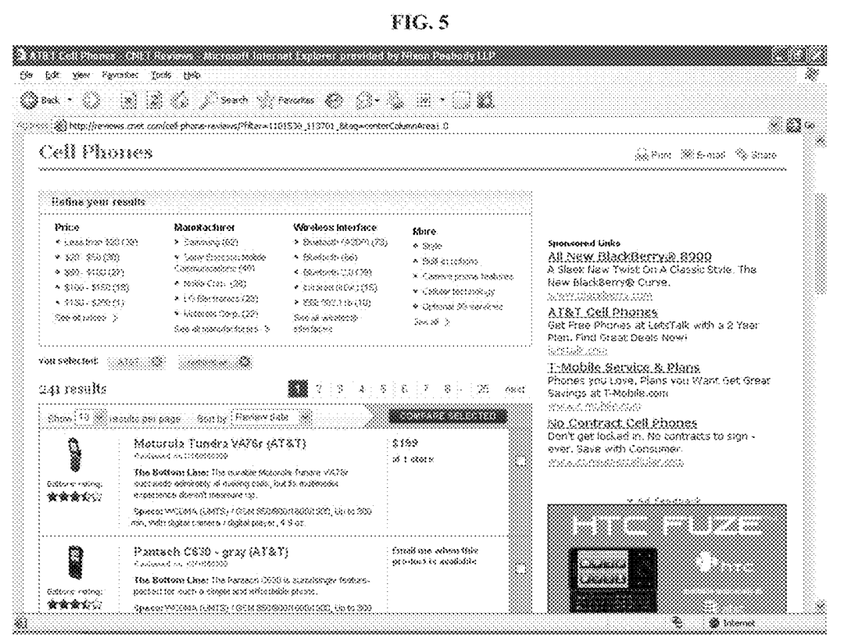
FIG. 5 is a screenshot of an catalog in accordance with the invention depicting a page where AT&T™ cell phones have been selected.
Figure 6:
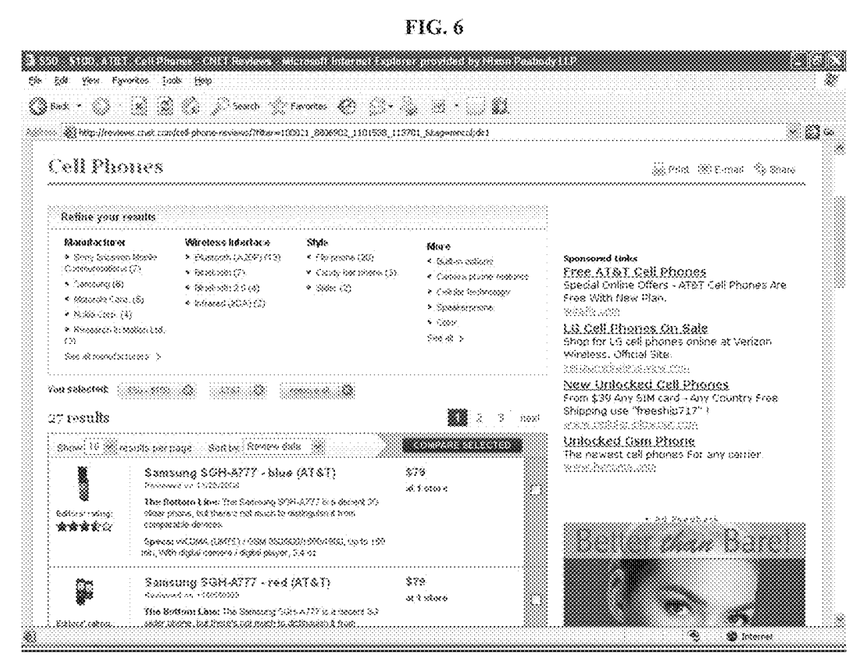
FIG. 6 is a screenshot of an catalog in accordance with the invention depicting a AT&T™ cell phones selling for between $50-$100 have been selected.
Figure 7:
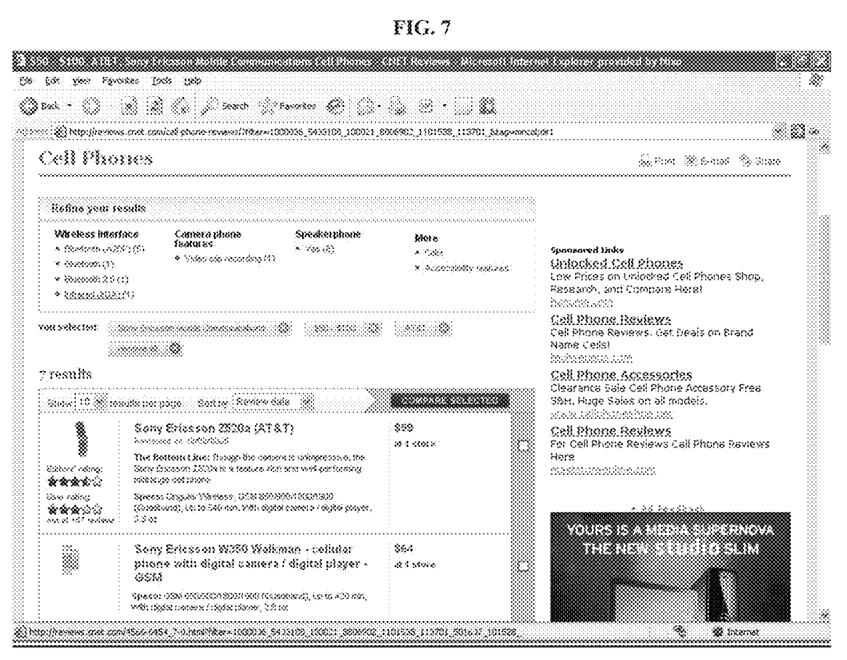
FIG. 7 is a screenshot of an catalog in accordance depicting a AT&T™ cell phones selling for between $50-$100 made by Sony Ericsson™ have been selected.

The information shown by the screenshots in FIG. 3-7 is now explained in more detail, as an example of how the user selects filter parameters. FIG. 3 shows a home page of a shopping website, CNET.COM™, which offers access to a catalog of technology products, each of which has multiple attributes associated with it, each of which has a corresponding value. As can be seen in FIG. 3, some of the categories of technology which are in the catalog include "Appliances", "Cell Phones", "GPS", "Laptops", and many others. When a user clicks on one of these hyperlinks, he or she is brought, for example, to a page as shown in FIG. 4, which would result if the user had chosen the "Cell Phones" category from the homepage in FIG. 3. The catalog then allows the user to navigate from among the many cell phones in the catalog by progressively choosing filter parameters which narrow the selection of cell phones under consideration. Continuing our example, the user might choose that his or her preference was to see cell phones whose service provider was AT&T™. This would restrict consideration by the catalog to the 241 cell phones whose associated service provider is AT&T™. This leads to the resulting display of FIG. 5, which shows the first two phones in an extended list of phones whose service provider is AT&T™. At this point, the set of criteria displays further narrowing filter parameters for selection by the user, such as price, manufacturer, wireless interface, and others. It is to be noted, of course, that this filtration is progressive, i.e. additive. That is, once it has been selected that the service provider is AT&T™, the catalog is designed to reflect, as in FIG. 6, after the appropriate filter parameter selection, only those $50-$100 phones that are also designed to have AT&T™ as a service provider. Proceeding onwards, the user may select the additional filter given these two constraints that the manufacturer of the phone is Sony Ericsson Mobile™ communications, as in FIG. 7. Thus, by adding these progressive filters, the search set narrows from hundreds of potential cell phones to 241 AT&T™ cell phones to 27 AT&T™/$50-$100 cell phones to 7 AT&T™/$50-$100/Sony Ericsson Mobile™ cell phones.

As a system accepts filter input while users search the catalog, it is possible to monitor the set of filter parameters that users of a catalog system enter over a period of time. This data can be used to draw inferences about the behavior of the overall group of users who have contributed to a set of filter parameters. Alternatively, this data may be used for other applications, such as by using text or graphics to summarize or depict the data, so that users may draw their own conclusions about what the data represents. Furthermore, the data from monitoring the set of filter parameters may allow the system to adopt a more intelligent approach to the filter interface with the users, in that it may allow the catalog interface to be able to be more or less selective about which filters or how many filters should become displayed to the user for their potential selection at any given time.

Figure 9:
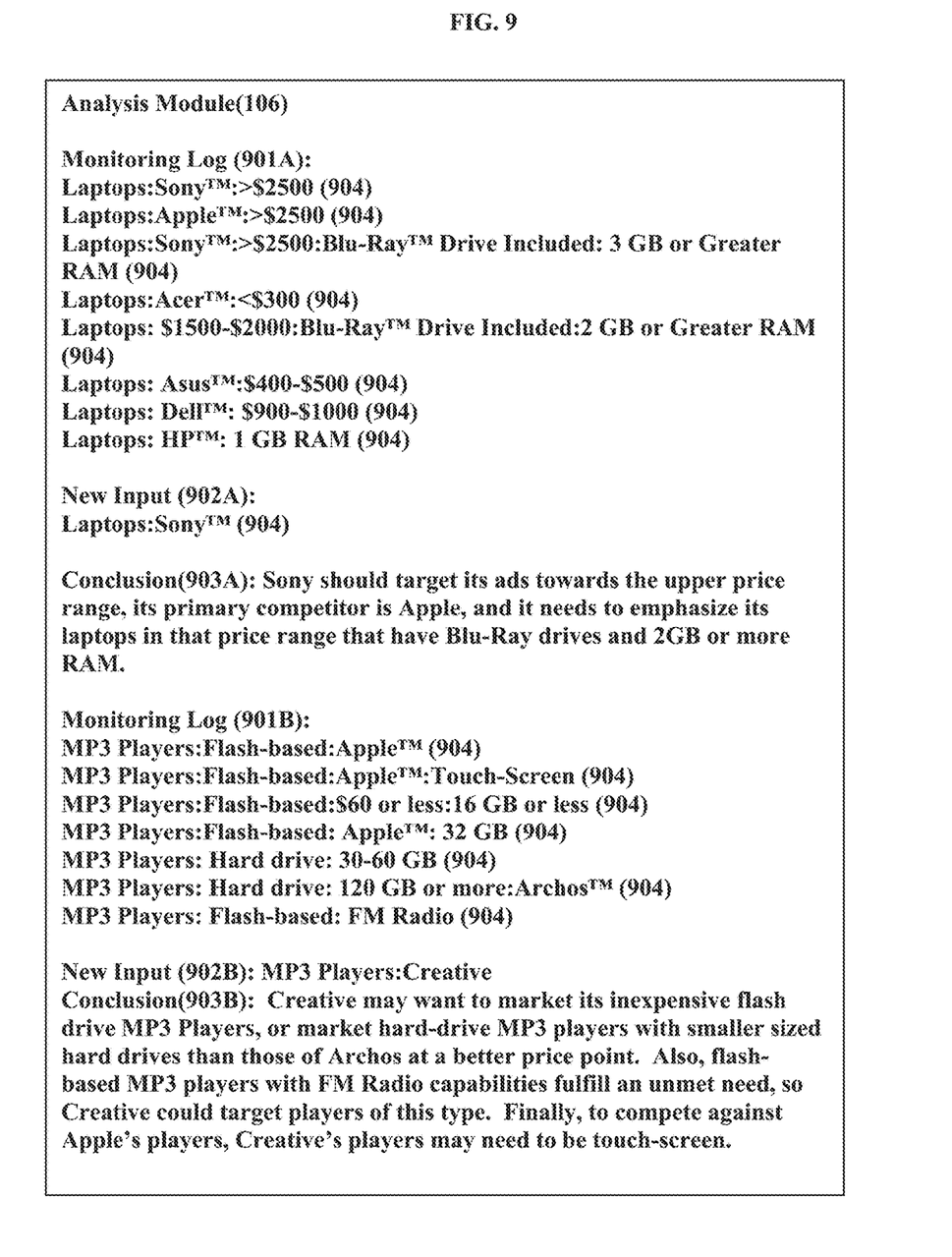
FIG. 9 is a mock display of recorded filter parameter logs and conclusions reached by an embodiment.

Some examples of this record of the filter selections are portrayed as being stored in one embodiment in FIG. 9 in the analysis module 106. A monitoring log 901 may consist of a flat file of entries indicating filters selected by users. Each filter is a sequence of selected filter parameters. The filter parameter selections in monitoring log 901 may be stored in any usable format, but an exemplary format would be to use a text file, and to have one entry per line, with the filter parameters in the filter parameter set separated by commas. In the embodiments, at each stage of this narrowing process, the user is presumed to express a preference about what he or she is interested in. By adding a facility to the website which tracks the user's clicks by which he or she progressively selects the filter parameters, and thereby narrows the set of available products to produce a smaller set of products with characteristics that the user is looking for, a set of potentially useful data is generated. The user's actions may be captured, for example, if the catalog is accessed via a web page, where the web page consists of an HTML or XHTML document, by incorporating a facility which maintains a set of variables which change based on the user clicking on various filters. Technologies such as JavaScript scripts, Perl scripts, Java applets, JSP, ASP, as well as any other technology known in the art that allows the web page to register a click in a variable may be used by the various embodiments to maintain a tally of filter parameter selections within the taxonomy for further analysis and/or manipulation. In the preferred embodiment, they are stored as noted above in a monitoring log 901 as monitoring log entries 904, but any record of filter parameter selection which allows the analysis module to make inferences based on the filter parameters will be sufficient. The analysis module processes the information in a monitoring log 901 in combination with a new input 902 to yield a conclusion 903. The processing techniques used are discussed in more detail below, for example scenarios 901A and 902A yielding 903A, as well as 901B and 902B yielding 903B.

An alternative embodiment further acquires additional information about the selections made of the various filters with the catalog system with respect to the hierarchy, storing, instead of a mere tally of selections, a tally of selections along with level information. For example, if the product were MP3 players, the embodiment would be capable of storing how many users selected Sony™ MP3 players as their first choice of filter parameter, as opposed to second, third, etc. Alternatively, this tallying can be done on the fly to analyze the filter selections from a monitoring log 901.

The embodiments make their content recommendations by comparing the information stored in the monitoring log 901 with the filter selections of a new user. By making these comparisons, an unmet need exists for an invention that will identify favorable marketing opportunities based on the relationship between past, monitored filter settings and the prospective potential interests of a new set of filter settings. In general, the analysis module 106 may employ any relevant heuristic or rule which takes the raw data from the monitoring log 901 and, based on the new input 902, yields a rational conclusion as to which content the embodiment should recommend. The following are examples which illustrate how embodiments might take various types of data and make recommendations.

Once the filter parameters have been acquired by the user interface module 106, a user activity data analysis module 108 generates content recommendations based upon patterns in the data. These patterns may be both general patterns, as well as patterns that depend upon the specific nature of the attributes involved. They may be recognized by algorithms, heuristics, mathematical analysis, statistical analysis, and/or user inspection of the data. In one embodiment, they may involve analysis of data that only incorporates the number of selections of a given filter. In another embodiment, the analysis may incorporate level information, as described above. In yet another embodiment, the user may restrict the time interval over which system input is to be considered for purposed of the analysis. The user may also restrict the population of users whose actions are considered for the analysis, by factors such as, but not limited to, geographic location, IP address, demographics such as age, gender, groupings (such as Macintosh™ users, gamers, business professionals, IT professionals, etc.). Optionally, an embodiment may include a facility to gather such information from the user to aid in the later analysis of the user's filter selections. Such a facility to gather information about the user may be integrated into the web page as a form, or it may take the form of a pop-up box. Alternatively, the embodiment may automatically gather information about the user by associating his or her IP address with information gained by associating that IP address with information in a database.

Figure 8:
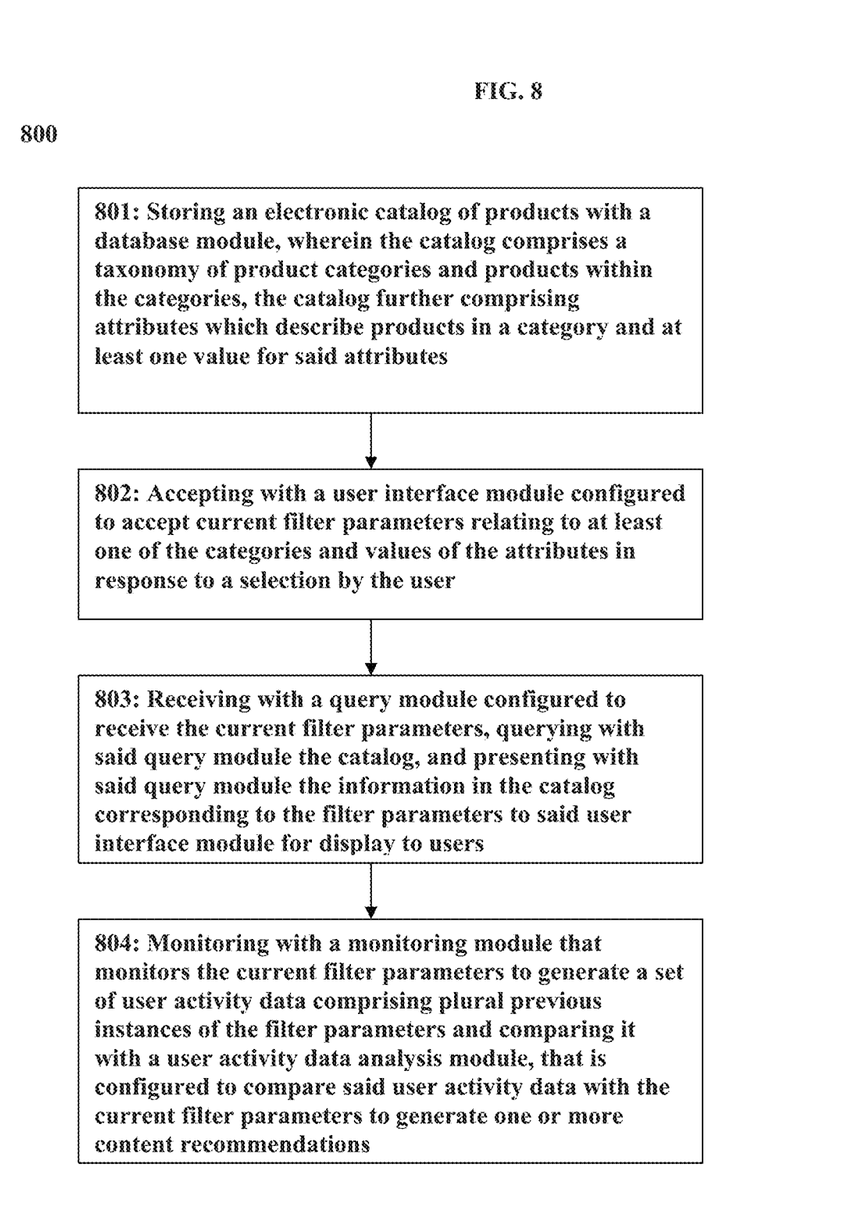
FIG. 8 is a flowchart illustrating the method according to one embodiment of the invention.

Thus, overall, the embodiments may include a method 800 involving steps to be performing on a computing system, consisting of multiple modules designed to perform computing functions which transform data monitoring results, wherein at least part of the computing system's functionality is performed by hardware, which is portrayed in FIG. 8, comprising: storing an electronic catalog of products with a database module, wherein the catalog comprises a taxonomy of product categories and products within the categories, the catalog further comprising attributes which describe products in a category and at least one value for said attributes 801, accepting with a user interface module configured to accept current filter parameters relating to at least one of the categories and values of the attributes in response to a selection by the user 802, receiving with a query module configured to receive the current filter parameters, querying with said query module the catalog, and presenting with the query module information in the catalog corresponding to the filter parameters to said user interface module for display to users 803, and monitoring with a monitoring module that monitors the current filter parameters to generate a set of user activity data comprising plural previous filter parameters;

and comparing with a user activity data analysis module, that is configured to compare said user activity data with the current filter parameters to generate one or more content recommendations 804.

FIG. 9 provides two specific examples of how content recommendations are based off of specific datasets in the analysis module (106). Given the data set in 901A, and the input that the user is about to view Sony™ laptops in 902A, the embodiment would conclude 903A that Sony should target its ads towards the upper price range, its primary competitor is Apple, and it needs to emphasize its laptops in that price range that have Blu-Ray™ drives and 2 GB or more RAM. It would base this conclusion on a combination of algorithms and heuristics implemented as software encoded on a computer-readable medium designed to be executed by a processor and/or hardware modules running as part of the analysis module 106. These heuristics would include rules which would identify that Blu-Ray™ drives and 2 GB or more RAM appear to be frequently correlated with the purchase of expensive laptops, there does not appear to be much interest in inexpensive laptops by Sony™, and hence Sony™ should target content which advertises its expensive laptops with these high-end features.

Given the data set in 901B, and the input that the user is about to view Creative™ MP3 players in 902B, the analysis module would process the dataset and conclude 903B Creative™ may want to market its inexpensive flash drive MP3 Players, or market hard-drive MP3 players with smaller sized hard drives than those of Archos™ at a better price point. Also, flash-based MP3 players with FM Radio capabilities fulfill an unmet need, so Creative™ could target players of this type. Finally, to compete against Apple™'s™ players, Creative™'s players may need to be touch-screen. These conclusions would be based upon the fact that there appears to be demand for hard drive players of moderate size, but there is only interest in Archos™'s high-end product, and the bulk of the interest in the flash-memory market appears to be in Apple™'s products, but offering FM Radio could be a competitive advantage, and because customers who show interest in Apple also show interest in touch screens, it could help Creative™ to compete if their players also had a touch-screen.

In general, the heuristics mathematically and statistically analyze the pool of filter parameter selections, looking for situations such as correlations, contrasts, and frequent and infrequent occurrences of types of data, or any other type of relationship which leads to a rational content recommendation. Some further examples of how content recommendations are generated are herein provided with respect to an electronic catalog of consumer electronics products. For example, suppose, hypothetically, that the system has tracked searches by users for cell phones. An analysis of which attribute was selected first may show that 53% of the users select Service provider as their first attribute, and only 6% select Price. Moreover, this analysis may be done at multiple levels. For example, a check could be done to see that in the course of a user's overall search for cell phones, 85% select Service provider at some point (i.e. first selection or any subsequent selection whereas only 27% select Manufacturer at all during their search.

Taking this example, analyzing the information can lead to valuable conclusions, which can be used to target content. First, manufacturers can observe which categories within their brand receive more attention. For example, suppose that 85% of users search for Apple™ MP3 players, but only 46% search for Apple™ laptops. Armed with this information, Apple™ could decide whether it wants to advertise to try to increase penetration in the laptop market, where it is relatively weak, or whether it wants to advertise to try to maintain its market dominance in the MP3 player market. An embodiment may be preconfigured for either of these options, or may be configured by the user, either to recommend that a company (who may be related to a product with a attribute such as manufacturer, service provider, or the like) that it sell products of the type where users have shown the most interest, or the least interest.

Another approach to the data would be to examine category data, and look for categories where no single company or where small groups of companies monopolize the interest of users. For example, the data might indicate that printers would be a good category to target, but MP3 players might be harder to break into if a company like Apple™ has a "lock" on the market due to intense user interest.

Alternatively, in the case where Apple™ has considerable loyalty within the MP3 player market, a competing MP3 player like Creative™ or Sony™ may decide that it would be desirable to place ads in this situation to attempt to break the dominance in the marketplace. Also, even when there is no dominance in a market, there may be a specific rivalry within a niche market. For example, if the data indicates an incident of interest in Epson™ inkjet printers above a certain threshold, Brother™ may decide to advertise so as to try to convert users away from Epson™.

An embodiment may also provide for the simple case where a company simply has low market penetration for a specific class of products, but the class in general is faring well. If HP™ observes that their desktop machines are selected by users below a preset or user-set threshold of the time, an embodiment may recommend that HP™ target ads to promote these machines because they may want to increase market share. Alternatively, if the selection occurs below a certain threshold of the time, the embodiment may recommend that the user not target ads for these products, because they are in a weak position in the market.

Another factor which allows the embodiments to aid in targeting is price. If users search for a specific price range frequently, an embodiment recommends targeting ads for products by a given company that correspond to that price range. Likewise, if a given price range is not selected frequently, the embodiment would not recommend targeting products within the infrequently selected price range.

However, beyond recommendations that stem from past buying patterns various embodiments can make dynamic recommendations for ad placement based on a user's present choice of filters. For example, suppose that the user chooses laptops by Toshiba™ for over $1500. Then, the embodiment may offer an ad placement to Lenovo™ or Sony™ or another manufacturer, who wishes to compete with its own expensive laptops. Alternatively, the embodiment could offer an ad placement to a company like Asus™ or Acer™, who may wish to compete by selling a similar, less expensive product.

This principle can operate in reverse of course . . . if the user selects LCD TVs for $1000 from Vizio™, Sony™ may wish to buy an ad which extols the virtue of the features of its own, more expensive televisions, which it may believe to be of higher quality or possess a better reputation. In general, various embodiments allow targeting based on the most and least popular values of attributes, as well as threshold numbers of selections of the attributes, both at the first-selection level and the overall-selection level, though finer tuning (first-and-second selection, first-though-third selections, for example) is of course possible on a predetermined or user-set basis. It is also to be noted that selecting the filters need not require progressively selecting and redisplaying lists as has been described heretofore. Embodiments may also implement filter selection by methods which include drop-down boxes and controls which allow the user to drill down through selection of filters on a single screen in advance, without redisplaying the list of relevant products each time a selection is made.

The content recommendation technique provided by these embodiments offers many advantages. First, the catalog structure of products, accompanied by a taxonomy, represents an efficient and effective way to store and manipulate a group of products. Whether the products are a set of generalized products, a category of products such as consumer electronics or apparel, or a niche set of products such as antique coins, using a taxonomy and filters as described above allows efficient display and navigation of the products. While various interface features may vary in the various embodiments, the lists may be sorted according to various attributes, or alternatively according to other metrics to allow easy access to the most relevant items. That is, continuing the example of consumer electronics, the lists may be sorted according to factors related to the review and product characteristics including, but not limited to: Review date, Editor's Rating, and User's Rating and Lowest Price. The monitored filter data further leads to the ability to target content, which is desirable for several reasons, as set forth above. First, it allows advertisers to pick and choose more carefully how they will spend their money advertising on the catalog website and elsewhere. Moreover, this is an unexpected result because filter selection data has not heretofore been monitored to draw conclusions about what content would represent a good investment based on patterns in said filter data.

Another advantage of the embodiments is that they allow the advertisers to target smaller niches. Motor™ may discover that Bluetooth™ enabled phones are an area where it is most competitive, for example. Also, as previously discussed, ads can be targeted to change brand loyalty. If a specific brand has a large market share, ads can be placed to target that market.

Furthermore, if users show great interest in a type of product, but there is not much specification of a given brand of product, companies seeking to enter the market will know to target users with ads for that type of product because users may be open to new brands. For example, if there are a lot of searches for desktops with hard drive capacity of 500 GB or greater and no brands accompany those searches, embodiments will be able to recommend that advertisers that sell that type of machine target ads at this relatively unexploited market.

Finally, the embodiments would be potentially capable of following up on correlations between ad placements and filter selection. For example, those who filtered for Apple™ cell phones might be more likely to subsequently click on ads for hybrid cars, or purchasers of Sony™ laptops might be likely to click on ads for Ralph Lauren™ apparel. This cross-selling aspect of the embodiments enhance their functionality by allowing cross-selling across industries. Furthermore, because the owners of the embodiments will be able to offer highly targeted ads within their catalog and valuable information about how to target ads externally. This will allow the catalog owner to charge more, because the ads will be worth more.

In various embodiments the ads based on the recommendations may be displayed in the same window, or in a separate window, such as via a pop-up ad. If they are displayed in the same window of a list of products which obey a set of filter parameters, for example, they may be placed above or below the list, or to the left or right of the list, or somewhere in the middle of the list, possibly dividing the list into two parts in a strategic manner.

Alternative embodiments may provide multiple recommendations at the same time. For example, suppose that there is data, based on filter selection, that there is a lot of interest in Apple™ MP3 players, costing $200-$300. (Suppose that Apple™ receives 87% of the clicks in this category. An embodiment could observe that Microsoft™ might have a product that competes directly in this price range with similar features, and Creative™ has products that have slightly fewer features, but might cost less. The embodiment could suggest to both Microsoft™ and Creative™ that they should target ads for their products when the user makes the filter selection of Apple™ MP3 players costing $200-$300.

An example dataset should clarify the operation of the embodiments. Suppose that the category being analyzed is desktops. Further suppose that there have been 20 sets of filter parameters who selected Apple™, then $1000-$1200, 20 sets of filter parameters where the user selected Sony™, then all-in-one desktop system, and 50 sets of filter parameters where the user selected HP™, 20 of which where the user further selected $1400-$1600, and 30 of which where the user selected all-in-one desktop system. Suppose further that the user has selected HP™ as their initial filter parameter.

An embodiment would be able to make the following recommendations, among others. First, it could suggest to Apple™ or Sony™ that they advertise their machines to the user, because they have apparently achieved relatively low market penetration based on the fact that users are apparently seeking out their products less. Second, it could suggest to Sony™ that it should advertise its all-in-one desktop systems especially, because there is interest in this type of desktop, but not as much as for the HP™. Third, it could suggest to Apple™ that it advertise its cheaper machines to the user, because there is interest in them, and that it might be able to show that it can offer comparable products to HP™'s at a lower price.

As an alternative example, take a situation in the realm of MP3 players where there were 90 filter selections for Apple™, 80 of which were accompanied by a selection that the MP3 player be flash memory, 5 accompanied by a selection that it be hard-drive based, along with 5 selections for Microsoft™, 4 of which were accompanied by a selection that the MP3 player be hard-drive based and 1 flash memory based. In this situation, if Creative™ used the embodiments to procure a recommendation, the embodiment might suggest that the market is dominated by Apple™ in the flash memory MP3 player market, but there is a more level playing field in the hard-drive based players so Creative™ might have a good opportunity to market if it attempted to market its hard-drive players. Moreover, if the user does click that he or she is interested in buying a flash memory based player, the embodiments would make it clear that the significant market opponent is Apple's™ products such as the iPod™, and hence advertisements should be targeted to counter Apple's™ marketing rather than Microsoft's™.

Thus, the embodiments allow collection of information about the users' filter preferences which can reflect not only long-term trends in filter selection, but can also be used to determine how the relationship between these trends and the user's present interests indicate ways of effectively marketing to the user. Thus, these embodiments represent a powerful and sophisticated e-commerce tool which brings unexpected advantages to the field of marketing by monitoring the filter data.

It should be noted that the content targeting system 100 is illustrated and discussed herein as having various modules which perform particular functions and interact with one another. It should be understood that these modules are merely segregated based on their function for the sake of description and do not necessarily represent discrete hardware or software code which is stored on a computer-readable medium for execution on appropriate computing hardware such as a processor. In this regard, these modules, units and other components may be hardware and/or software stored on a computer-readable medium for execution on appropriate computing hardware such as a processor may be thus implemented to substantially perform their particular functions explained herein. The various functions of the different modules and units can be combined or segregated as hardware and/or software stored on a computer-readable medium as above as modules in any manner, and can be used separately or in combination.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. A computer-implemented method, performed by one or more computing devices, for providing a user interface for navigation of an electronic catalog of assets the method comprising:
    accessing an electronic catalog of asset records recorded as data structures in a taxonomy of categories of assets, the categories having corresponding attributes describing characteristics of assets in the category, and attributes having corresponding attribute values associated with the characteristic indicated by the attribute;
    transmitting, by at least one of the one or more computing devices, a user interface including a first filter parameter set configured to allow a user to select one or more filter parameters corresponding to attribute values of assets in the electronic catalog;
    receiving, by at least one of the one or more computing devices, selection of a first filter parameter in the first filter parameter set;
    storing, by at least one of the one or more computing devices, in a monitoring log, the attribute value corresponding to the first filter parameter selection as a first tier attribute value;
    transmitting, by at least one of the one or more computing devices, a second filter parameter set configured to allow the user to select one or more filter parameters corresponding to attribute values of a subset of assets in the electronic catalog, each asset in the subset having the attribute value corresponding to the first filter parameter selection;
    receiving, by at least one of the one or more computing devices, selection of a second filter parameter in the second filter parameter set;
    storing, by at least one of the one or more computing devices, in the monitoring, log the attribute value corresponding to the second filter parameter selection as a second tier attribute value with an indication that the second tier attribute value was selected as a sub-attribute of the first tier attribute value;
    analyzing, by at least one of the one or more computing devices, the second tier attribute value and the indication that the second tier attribute value was selected as a sub-attribute of the first tier attribute value in conjunction with past progressive filter selection information stored in the monitoring log; and
    generating, by at least one of the one or more computing devices, one or more asset recommendations based on the analysis.

2. The method of claim 1, wherein the past progressive filter selection comprises a data set indicating for each of a plurality of users an ordered progressive filter parameter selections including at least a selection of one of the filter parameters in the first filter parameter set and a subsequent selection of one of the filter parameters in the second filter parameter set.

3. The method of claim 1, wherein the attribute values stored in the monitoring log are associated with a user identifier, and
    wherein the analyzing step analyzes the second tier attribute value and the indication that the second tier attribute value was selected as a sub-attribute of the first tier attribute value in conjunction with past progressive filter selection information associated with the user identifier.

4. The method of claim 3, wherein the user identifier is an IP address.

5. The method of claim 3, wherein the user identifier is a geographic location.

6. The method of claim 1, wherein the attribute values stored in the monitoring log are associated with date of selection, and
wherein the analyzing step analyzes the second tier attribute value and the indication that the second tier attribute value was selected as a sub-attribute of the first tier attribute value in conjunction with past progressive filter selection information associated made after a determined date.

7. The method of claim 1, wherein the assets are digital media.

8. The method of claim 1, wherein the assets are products.

9. The method of claim 1, wherein the analyzing step weights the first tier attribute value as more important than the second tier attribute value.

10. A system for providing a user interface for navigation of an electronic catalog of assets, the system comprising:
a memory; and
a processor operatively coupled to the memory, the processor configured to perform the steps of:
accessing an electronic catalog of asset records recorded as data structures in a taxonomy of categories of assets, the categories having corresponding attributes describing characteristics of assets in the category, and attributes having corresponding attribute values associated with the characteristic indicated by the attribute;
transmitting a user interface including a first filter parameter set configured to allow a user to select one or more filter parameters corresponding to attribute values of assets in the electronic catalog;
receiving a selection of a first filter parameter in the first filter parameter set;
storing in a monitoring log the attribute value corresponding to the first filter parameter selection as a first tier attribute value;
transmitting a second filter parameter set configured to allow the user to select one or more filter parameters corresponding to attribute values of a subset of assets in the electronic catalog, each asset in the subset having the attribute value corresponding to the first filter parameter selection;
receiving a selection of a second filter parameter in the second filter parameter set;
storing in the monitoring log the attribute value corresponding to the second filter parameter selection as a second tier attribute value with an indication that the second tier attribute value was selected as a sub-attribute of the first tier attribute value;
analyzing the second tier attribute value and the indication that the second tier attribute value was selected as a sub-attribute of the first tier attribute value in conjunction with past progressive filter selection information stored in the monitoring log; and
generating one or more asset recommendations based on the analysis.

11. The system of claim 10, wherein the past progressive filter selection comprises a data set indicating for each of a plurality of users an ordered progressive filter parameter selections including at least a selection of one of the filter parameters in the first filter parameter set and a subsequent selection of one of the filter parameters in the second filter parameter set.

12. The system of claim 10, wherein the attribute values stored in the monitoring log are associated with a user identifier, and
wherein the analyzing step analyzes the second tier attribute value and the indication that the second tier attribute value was selected as a sub-attribute of the first tier attribute value in conjunction with past progressive filter selection information associated with the user identifier.

13. The system of claim 12, wherein the user identifier is an IP address.

14. The system of claim 12, wherein the user identifier is a geographic location.

15. The system of claim 10, wherein the attribute values stored in the monitoring log are associated with date of selection, and
wherein the analyzing step analyzes the second tier attribute value and the indication that the second tier attribute value was selected as a sub-attribute of the first tier attribute value in conjunction with past progressive filter selection information associated made after a determined date.

16. The system of claim 10, wherein the assets are digital media.

17. The system of claim 10, wherein the assets are products.

18. The system of claim 10, wherein the analyzing step weights the first tier attribute value as more important than the second tier attribute value.

19. Non-transitory computer-readable media having computer-readable code stored thereon that, when executed by a computing device, performs a method for providing a user interface for navigation of an electronic catalog of assets, the method comprising:
accessing an electronic catalog of asset records recorded as data structures in a taxonomy of categories of assets, the categories having corresponding attributes describing characteristics of assets in the category, and attributes having corresponding attribute values associated with the characteristic indicated by the attribute, each asset record corresponding to an asset, at least some of the asset records having attributes indicating a characteristic of the corresponding item and at least some of attributes having a set of attribute values, the attribute values describing the characteristic indicated by the corresponding attribute;
transmitting a user interface including a first filter parameter set configured to allow a user to select one or more filter parameters corresponding to attribute values of assets in the electronic catalog;
receiving a selection of a first filter parameter in the first filter parameter set;
storing in a monitoring log the attribute value corresponding to the first filter parameter selection as a first tier attribute value;
transmitting a second filter parameter set configured to allow the user to select one or more filter parameters corresponding to attribute values of a subset of assets in the electronic catalog, each asset in the subset having the attribute value corresponding to the first filter parameter selection;
receiving a selection of a second filter parameter in the second filter parameter set;
storing in the monitoring log the attribute value corresponding to the second filter parameter selection as a second tier attribute value with an indication that the second tier attribute value was selected as a sub-attribute of the first tier attribute value;

analyzing the second tier attribute value and the indication that the second tier attribute value was selected as a sub-attribute of the first tier attribute value in conjunction with past progressive filter selection information stored in the monitoring log; and generating one or more asset recommendations based on the analysis.

20. The media of claim 19, wherein the past progressive filter selection comprises a data set indicating for each of a plurality of users an ordered progressive filter parameter selections including at least a selection of one of the filter parameters in the first filter parameter set and a subsequent selection of one of the filter parameters in the second filter parameter set.

21. The media of claim 19, wherein the attribute values stored in the monitoring log are associated with a user identifier, and wherein the analyzing step analyzes the second tier attribute value and the indication that the second tier attribute value was selected as a sub-attribute of the first tier attribute value in conjunction with past progressive filter selection information associated with the user identifier.

22. The media of claim 21, wherein the user identifier is an IP address.

23. The medium of claim 21, wherein the user identifier is a geographic location.

24. The media of claim 19, wherein the attribute values stored in the monitoring log are associated with date of selection, and wherein the analyzing step analyzes the second tier attribute value and the indication that the second tier attribute value was selected as a sub-attribute of the first tier attribute value in conjunction with past progressive filter selection information associated made after a determined date.

25. The media of claim 19, wherein the assets are digital media.

26. The media of claim 19, wherein the assets are products.

27. The media of claim 19, wherein the analyzing step weights the first tier attribute value as more important than the second tier attribute value.

* * * * *